(12) United States Patent
Mathur et al.

(10) Patent No.: US 10,911,482 B2
(45) Date of Patent: Feb. 2, 2021

(54) METHOD OF DETECTING CYBER ATTACKS ON A CYBER PHYSICAL SYSTEM WHICH INCLUDES AT LEAST ONE COMPUTING DEVICE COUPLED TO AT LEAST ONE SENSOR AND/OR ACTUATOR FOR CONTROLLING A PHYSICAL PROCESS

(71) Applicant: Singapore University of Technology and Design, Singapore (SG)

(72) Inventors: Aditya Mathur, Singapore (SG); Sridhar Adepu, Singapore (SG)

(*) Notice: Subject to any disclaimer, the term of this patent is extended or adjusted under 35 U.S.C. 154(b) by 195 days.

(21) Appl. No.: 16/090,031

(22) PCT Filed: Mar. 28, 2017

(86) PCT No.: PCT/SG2017/050158
§ 371 (c)(1),
(2) Date: Sep. 28, 2018

(87) PCT Pub. No.: WO2017/171639
PCT Pub. Date: Oct. 5, 2017

(65) Prior Publication Data
US 2020/0162482 A1 May 21, 2020

Related U.S. Application Data

(60) Provisional application No. 62/314,604, filed on Mar. 29, 2016.

(51) Int. Cl.
*H04L 29/06* (2006.01)
*G06F 21/55* (2013.01)
(Continued)

(52) U.S. Cl.
CPC ........ *H04L 63/145* (2013.01); *H04L 63/1416* (2013.01); *G05B 19/04* (2013.01);
(Continued)

(58) Field of Classification Search
CPC ... H04L 63/14; H04L 63/145; H04L 63/1416; H04L 63/1425; H04L 65/80; G06F 21/55;
(Continued)

(56) References Cited

U.S. PATENT DOCUMENTS

| 9,203,859 B2 | 12/2015 | Sampigethaya |
| 2005/0229254 A1 | 10/2005 | Singh et al. |

(Continued)

FOREIGN PATENT DOCUMENTS

| WO | 2015104691 A2 | 7/2015 |
| WO | 2017171639 A1 | 10/2017 |

OTHER PUBLICATIONS

Towards Cyber-Physical Agnosticism by Enhancing IEC 61499 with PTIDES Model of Computations; Valeriy Vyatkin, Cheng Pang, and Stavros Tripakis pp. 6; November (Year: 2015).*

(Continued)

*Primary Examiner* — Jeffrey C Pwu
*Assistant Examiner* — Ali H. Cheema

(57) ABSTRACT

A method of detecting cyber attacks on a cyber physical system is disclosed, and the system includes at least one computing device coupled to at least one sensor and/or actuator for controlling a physical process. The method comprises: deriving at least one invariant for the computing device, based on a system design of the system or computer code configured to control the system in relation to the physical process or data collected from the system during testing or operation of the system, the invariant defining a set of conditions that enable determination from the sensor and/or actuator regarding process anomalies of the physical process being controlled; configuring the invariant as corresponding computer code; and executing the invariant as the computer code on the computing device to monitor the (Continued)

physical process via the sensor and/or actuator and detect the process anomalies for detecting the cyber attacks.

9 Claims, 9 Drawing Sheets

(51) Int. Cl.
  *H04W 12/12* (2009.01)
  *G05B 19/04* (2006.01)
  *G06N 20/00* (2019.01)
(52) U.S. Cl.
  CPC ............ *G06F 21/55* (2013.01); *G06F 21/552* (2013.01); *G06N 20/00* (2019.01); *H04L 63/14* (2013.01); *H04L 63/1425* (2013.01); *H04W 12/12* (2013.01)
(58) Field of Classification Search
  CPC . G06F 21/552; H04W 12/1208; H04W 12/12; G05B 99/00; G05B 19/04; G05B 19/0428; G06N 20/00; G06Q 10/063
  USPC .................... 726/1, 23, 22; 710/29; 713/189
  See application file for complete search history.

(56) References Cited

U.S. PATENT DOCUMENTS

| | | | | |
|---|---|---|---|---|
| 2008/0005392 | A1* | 1/2008 | Amini | H04L 65/80 710/29 |
| 2009/0282480 | A1* | 11/2009 | Lee | G06F 21/52 726/22 |
| 2012/0210158 | A1 | 8/2012 | Akiyama et al. | |
| 2012/0216243 | A1* | 8/2012 | Gill | G06Q 10/063 726/1 |
| 2014/0289852 | A1 | 9/2014 | Evans et al. | |
| 2015/0074422 | A1* | 3/2015 | Meyer | H04L 9/004 713/189 |
| 2015/0106933 | A1 | 4/2015 | Lee et al. | |
| 2016/0191555 | A1* | 6/2016 | Barkan | H04W 12/1208 726/23 |
| 2016/0274553 | A1* | 9/2016 | Strohmenger | G05B 19/41885 |
| 2016/0330225 | A1* | 11/2016 | Kroyzer | G06N 20/00 |
| 2017/0054751 | A1* | 2/2017 | Schneider | H04L 63/1425 |
| 2017/0230410 | A1* | 8/2017 | Hassanzadeh | H04L 41/0631 |

OTHER PUBLICATIONS

State-Dependent Sampling for Linear Time Invariant Systems: A Discrete Time Analysis; Sonia Maalej, Christophe Fiter, Laurentiu Hetel, Jean-Pierre Richard pp. 7; Sep. 18 (Year: 2012).*
S. Adepu and A. Mathur, "Using process invariants to detect cyber attacks on a water treatment system", Proceedings of the 31st International Conference on ICT Systems Security and Privacy Protection—IFIP SEC 2016, pp. 91-104.
E. Kang, S. Adepu, D. Jackson, and A. P. Mathur, "Model-based security analysis of a Water Treatment System", Proceedings of the 2nd International Workshop on Software Engineering for Smart Cyber-Physical Systems, May 2016.
S. Amin, A. Cardenas, and S.S. Sastry, "Safe and secure networked control systems under denial-of-service attacks", Hybrid Systems: Computation and Control. Proc. 12th Intl. Conf. (HSCC), vol. 5469, 2009, pp. 31-45.
S. Amin, X. Litrico, S. Sastry, and A. Bayen, "Cyber security of water SCADA systems", IEEE Transactions on Control Systems Technology, vol. 21, No. 5, Sep. 2013, pp. 1963-1970.
F. Blanchini, "Set invariance in control", Automatica, 34, 1999, pp. 1747-1767.
A.A. Cardenas, S. Amin, Z.-S. Lin, Y.-L. Huang, C.-Y. Hang, and S. Sastry, "Attacks against process control systems: Risk assessment, detection, and response", ACM Symp. Inf. Comput. Commun. Security, Mar. 2011.
A. Fagiolini, M. Housh, A. Ostfeld, and A. Bicchi, "Distributed estimation and control of water distribution networks by logical consensus", Communications, Control and Signal Processing (ISCCSP), May 2014, pp. 239-242.
S. Han, M. Xie, H.-H. Chen, and Y. Ling, "Intrusion detection in cyber-physical systems: Techniques and challenges", IEEE Systems Journal, vol. 8, No. 4, Dec. 2014, pp. 1049-1059.
Q. Zhu and T. Basar, "Robust and resilient control design for cyber-physical systems with an application to power systems", 50th IEEE Conference on Decision and Control and European Control Conference (CDC-ECC), 2011, pp. 4066-4071.
S.-W. Hsiao, Y. Sun, M.C. Chen, and H. Zhang, "Cross-level behavioral analysis for robust early intrusion detection", IEEE International Conference on Intelligence and Security Informatics (ISI), May 2010, pp. 95-100.
A. Wasicek, P. Derler, and E. Lee, "Aspect-oriented modeling of attacks in automotive cyber-physical systems", Design Automation Conference (DAC), 2014, Jun. 2014, pp. 1-6.
C. Kwon, W. Liu, and I. Hwang, "Security analysis for cyber-physical systems against stealthy deception attacks", American Control Conference (ACC), 2013, pp. 3344-3349.
F. Pasqualetti, R. Carli, and F. Bullo, "A distributed method for state estimation and false data detection in power networks", IEEE International Conference on Smart Grid Communications (SmartGridComm), Oct. 2011, pp. 469-474.
F. Pasqualetti, F. Doerfler, and F. Bullo, "Attack detection and identification in cyber-physical systems", IEEE Transactions on Automatic Control, vol. 58, No. 11, Nov. 2013, pp. 2715-2729.
L. Perelman, J. Arad, N. Oliker, A. Ostfeld, and M. Housh, "Water distribution systems event detection", Complexity in Engineering (COMPENG), Jun. 2012, pp. 1-3.
A. Rosich, H. Voos, and M. Darouach, "Cyber-attack detection based on controlled invariant sets", European Control conference (ECC), Jun. 2014, pp. 2176-2181.
Q. Niu, W. Jia, F. Yan, "Based on PLC Control System in the Application of Wastewater Treatment Plant", Proceedings of the ICCEAE, 2012, AISC 181, pp. 45-51.
A. Ray, "Autonomous Perception and Decision-making in cyber-physical Systems", 8th International Conference on computer Science & Education, Apr. 2013, pp. 1-10.
S. Adepu, and A. Mathur, "Detecting multipoint attacks in a water treatment system using intermittent control actions", Proceedings of the Singapore Cyber-Security Conference, 2016, pp. 59-74.
S. Ntalampiras, "Detection of Integrity attacks in cyber physical critical infrastructures using ensemble modeling", IEEE Transactions on Industrial Informatics, vol. 11, No. 1, Feb. 2015, pp. 104-111.
O. A. Harshe, "Preemptive detection of cyber attacks in industrial control systems", Faculty of the Virginia Polytechnic Institute and State University, Apr. 2015.
D. Parsons, A. Rashid, A. Telea, A. Speck, "An Architectural Pattern for Designing Component-Based Application Frameworks", Software—Practice and Experience, vol. 36, 2006, pp. 157-190.
S. Weinberger, "Computer security: Is this the start of cyberwarfare? ", Nature, vol. 474, Jun. 2011, pp. 142-145.
Kaung Myat Aung, "Secure Water Treatment Testbed (SWaT): An Overview", Singapore University of Technology and Design, Nov. 2015, pp. 1-17.
K. Stouffer and J. F. K. Scarfone, "Guide to Industrial Control Systems (ICS) Security", NIST Special Publication 800-82, Jun. 2011, pp. 1-155.
T. Paul, J. Kimball, M. Zawodniok, T. Roth, and B. McMillin, and S. Chellappan, "Unified invariants for cyber-physical switched system stability", Smart Grid, IEEE Transactions on smart grid, vol. 5, No. 1, Jan. 2014, pp. 112-120.
S. Adepu and A. Mathur, "Distributed detection of single-stage multipoint cyber attacks in a water treatment plant", Proceedings of the 11th ACM Asia Conference on Computer and Communications Security, May 2016, pp. 449-460.
S. Adepu and A. Mathur, "Introducing cyber security at the design stage of public infrastructures: A procedure and case study", Proceedings of the 2nd Asia-Pacific Conference on Complex Systems Design & Management, Feb. 2016, pp. 75-94.

(56) References Cited

OTHER PUBLICATIONS

S. Adepu and A. Mathur, "An investigation into the response of a water treatment system to cyber attacks", Proceedings of the 17th IEEE High Assurance Systems Engineering Symposium, Jan. 2016, pp. 141-148.
R. Alur, "Safety Requirements, Principles of Cyber-Physical Systems", Chapter 3, MIT Press, 2015, pp. 65-123.
S. Bak, F. Abad, Z. Huang, and M. Caccamo, "Using run-time checking to provide safety and progress for distributed cyber-physical systems", Embedded and Real-Time Computing Systems and Applications, 2013, pp. 287-296.
A. Choudhari, H. Ramaprasad, T. Paul, J. Kimball, M. Zawodniok, B. McMillin, and S. Chellappan, "Stability of a cyber-physical smart grid system using cooperating invariants", IEEE 37th Annual Computer Software and Applications Conference, 2013, pp. 760-769.
T. Paul, J. Kimball, M. Zawodniok, T. Roth, and B. McMillin, "Invariants as a unified knowledge model for cyber-physical systems", IEEE International Conference on Service-Oriented Computing and Applications, Dec. 2011, pp. 1-3.
S. Adepu and A. Mathur, "Distributed attack detection in a water treatment plant: Method and case study", IEEE Transactions on Dependable and Secure Computing, 2017.
A. P. Mathur and N. O. Tippenhauer, "SWaT: A water treatment testbed for research and training on ICS security", 2016 International Workshop on cyber-physical systems for Smart Water Networks (CySWater), Apr. 2016, pp. 31-36.
K. Pal, S. Adepu, and J. Goh, "Effectiveness of association rules mining for invariants generation in cyber-physical systems", Proceedings of the 18th IEEE Symposium on High Assurance Systems Engineering, IEEE Computer Society, Jan. 2017, pp. 124-127.
Industrial Control Systems ICS/SCADA, Checkpoint, 2019, Retrieved from http://www.checkpoint.com/products-solutions/critical-infrastructure/index.html.
ICS2 On-Guard, ICS2, 2014, Retrieved from http://ics2.com/products/ics2-on-guard-2/.
R. Lipovsky, "New wave of cyberattacks against Ukrainian power industry", welivesecurity, Jan. 2016, Retrieved from https://www.welivesecurity.com/2016/01/20/new-wave-attacks-ukrainian-power-industry/.
Foreign Communication from a Related Counterpart Application, International Search Report and Written Opinion dated Jun. 17, 2017, International Application No. PCT/SG2017/050158 filed on Mar. 28, 2017.

* cited by examiner

| PLC | Sensor/Actuator* | State variable | States | Purpose |
|---|---|---|---|---|
| 1 | si: FIT101 | $v_1$ | No flow: $v_1 \leq \delta$<br>Flow: $v_1 > \delta$ | Measures flow rate of water entering tank T101. |
| | sio: LIT101 | $v_2$ | $v_2 \in \{LL, L, H, HH\}$ | Indicates water level in tank T101. |
| | ai: MV101 | $v_3$ | Closed: $v_3 = 0$<br>Open: $v_3 = 1$ | Motorized valve; water flows into tank T101 only when MV101 is open. |
| | ao: P101 | $v_4$ | OFF: $v_4 = 0$<br>ON: $v_4 = 1$ | Pump to move water from stage 1 to stage 3 via stage 2. |
| | so: FIT201 | $v_{14}$ | No flow: $v_{14} \leq \delta$<br>Flow: $v_{14} > \delta$ | Measure flow rate of water from T101 to T301. |
| 2 | sio: FIT201 | $v_{14}$ | $v_5 \in \{LL, L, H, HH\}$ | Measures flow rate of water entering tank T301. |
| | ai: P101 | $v_4$ | OFF: $v_4 = 0$<br>ON: $v_4 = 1$ | |
| | ao: MV201 | $v_8$ | Closed: $v_8 = 0$<br>Open: $v_8 = 1$ | Motorized valve must be open when P101 is ON for water to flow into tank T301. |
| 3 | sio: LIT 301 | $v_5$ | $v_5 \in \{LL, L, H, HH\}$ | |
| | so: FIT301 | $v_6$ | No flow: $v_6 \leq \delta$<br>Flow: $v_6 > \delta$ | |
| | so: DPIT301 | $v_7$ | No backwash: $v_7 \leq \sigma$<br>Backwash: $v_7 > \sigma$ | |
| | ai: P101 | $v_4$ | OFF: $v_4 = 0$<br>ON: $v_4 = 1$ | |
| | ao: MV302 | $v_9$ | Closed: $v_9 = 0$<br>Open: $v_9 = 1$ | Motorized valve must be open when P101 is ON for water to flow into tank T301. |
| | ao: P301 | $v_{10}$ | OFF: $v_{10} = 0$<br>ON: $v_{10} = 1$ | Pump to move water from tank T301 to tank T401. |
| 4 | sio: LIT401 | $v_{11}$ | $v_{11} \in \{LL, L, H, HH\}$ | Indicates water level in tank T401 that holds the output of the UF unit. |
| | so: FIT401 | $v_{12}$ | No flow: $v_{12} \leq \delta$<br>Flow: $v_{12} > \delta$ | Measures flow rate of water exiting tank T302 and flowing to the dechlorination stage. |
| | ao: MV302 | $v_9$ | Closed: $v_9 = 0$<br>Open: $v_9 = 1$ | |
| | ai: P301 | $v_{10}$ | OFF: $v_{10} = 0$<br>ON: $v_{10} = 1$ | |
| | ao: P401 | $v_{13}$ | OFF: $v_{13} = 0$<br>ON: $v_{13} = 1$ | Pump to move water from tank T401 to RO unit. |

*Sensor/actuator nomenclature: s: sensor, a: actuator, i: input, o: output.

FIG. 4

| PLC | Invariants* | |
|---|---|---|
| | Backward check | Forward check |
| 1 | P1BC1: $v_2 = $ "L" $\to (v_3 = 1$ AND $v_1 > \delta)$<br>P1BC2: $v_2 = $ "H" $\to (v_3 = 0$ AND $v_1 \leq \delta)$ | P1FC1: $v_2 = $ "LL" $\to v_4 = 0$<br>P1FC2: $v_5 = $ "H" $\to v_4 = 0$ |
| 2 | P2BC1: $v_4 = 1 \to v_8 = 1$<br>P2BC2: $v_4 = 0 \to v_8 = 0$ | P2FC1: $v_5 = $ "HH" $\to v_8 = 0$<br>P2FC2: $v_5 = $ "H" $\to v_8 = 1$ |
| 3 | P3BC1: $v_5 = $ "H" $\to v_8 = 1$ AND $v_4 = 1$<br>P3BC2: $v_5 = $ "HH" $\to v_8 = 0$ AND $v_4 = 0$ | P3FC1: $v_5 = $ "LL" $\to v_{10} = 1$<br>P3FC2: $v_{10} = 0 \to v_6 < \delta$<br>P3FC3: $v_6 > \sigma \to v_{10} = 0$<br>P3FC4: $v_{11} = $ "L" $\to v_{10} = 1$ OR $v_9 = 1$<br>P3FC5: $v_{11} = $ "H" $\to v_{10} = 0$ |
| 4 | P4BC1: $v_{11} = $ "L" $\to v_{10} = 1$ OR $v_9 = 1$ | Forward check in PLC4 presently not implemented. |

*Each invariant is assigned a code for ease of reference in the implementation.

FIG. 6

| Scenario[1] | Sensor[2] | Attack |
|---|---|---|
| A1 (2:1:2:1) | 1: LIT101, [FIT101] | (0 → 1) (1 → 0) |
| | 3: LIT301 | Only Level sensor values are altered. |
| A2 (12:12:4:4) | 1: LIT101, [FIT101, FIT201] | (00 → 11) (01 → 10) (10 → 01) (11 → 00) |
| | 3: LIT301, [FIT301, DPIT301] | (00 → 11) (01 → 10) (10 → 01) (11 → 00) |
| A3 (2:12:2:4) | 1: MV101 | (0 → 1) (1 → 0); only one sensor attacked. |
| | 3: P101, MV201 | (00 → 11) (01 → 10) (10 → 01) (11 → 00) |
| A4 (12:176:4:16) | 1: MV101, P101 | (00 → 11) (01 → 10) (10 → 01) (11 → 00) |
| | 3: P101, MV201, P301, MV302 | (00 → 11) (01 → 10) (10 → 01) (11 → 00) |
| A5 (176:704:16:64) | 1: FIT101, FIT201, MV101, P101 | (0000 → 1111) (0001 → 1110) (0010 → 1101) (0011 → 1100)(0100 → 1011) (0101 → 1010) (0110 → 1001) (0111 → 1000)(1000 → 0111) (1001 → 0110) (1010 → 0101) (1011 → 0100)(1100 → 0011) (1101 → 0010) (1110 → 0001) (1111 → 0000) |
| | 3: FIT301, DPIT301, P101, MV201, P301, MV302 | Only 10 experiments were conducted in this case. |
| A6 (56:176:8:16) | 1: LIT101, [MV101, FIT101, FIT201] | (001 → 011)(001 → 110)(010 → 101)(011 → 100)(100 → 011)(101 → 011)(110 → 001)(111 → 000) |
| | 3: LIT301, [FIT301, DPIT301, P101, MV302] | Only 10 experiments were conducted in this and the above case. |

[1] a:b:c:d: a: attack combinations in PLC1, b: attack combinations in PLC3, c: attacks implemented in PLC1, d: attacks implemented in PLC3. Two or more sensors/actuators compromised in addition to LIT where mentioned excepting A3:1.

[2] n: X- n denotes the PLC and X the sensors affected by the attack. Level sensors (LIT) are continuously manipulated by the attacker to ensure that the water level indicated to the corresponding PLC corresponds to the altered states of the actuators and sensors. Items in brackets are explained in Example 4.

FIG. 8

METHOD OF DETECTING CYBER ATTACKS ON A CYBER PHYSICAL SYSTEM WHICH INCLUDES AT LEAST ONE COMPUTING DEVICE COUPLED TO AT LEAST ONE SENSOR AND/OR ACTUATOR FOR CONTROLLING A PHYSICAL PROCESS

CROSS-REFERENCE TO RELATED APPLICATIONS

The present application is a filing under 35 U.S.C. 371 as the National Stage of International Application No. PCT/SG2017/050158, filed Mar. 28, 2017, entitled "Method of Detecting Cyber Attacks on a Cyber Physical System Which Includes At Least One Computing Device Couples to At Least One Sensor and/or Actuator For Controlling a Physical Process," which claims priority to U.S. Application No. 62/314,604 filed with the United State Patent and Trademark Office on Mar. 29, 2016, and entitled "Method of Detecting Cyber Attacks on a Cyber Physical System Which Includes At Least One Computing Device Couples to At Least One Sensor and/or Actuator For Controlling a Physical Process," both of which are incorporated herein by reference in their entirety for all purposes.

FIELD

The present invention relates to method of detecting cyber attacks on a cyber physical system which includes at least one computing device coupled to at least one sensor and/or actuator for controlling a physical process.

BACKGROUND

A Cyber Physical System (CPS) consists of a physical process controlled by a computation and communications infrastructure. Typically, a CPS consists of multiple stages, where a Programmable Logic Controller (PLC), or a Remote Terminal Unit (RTU), controls each stage. It is to be appreciated that the term PLC also refers to an RTU in this document. Each PLC controls a subprocess. The control actions are based on the current process state obtained through a network of sensors, and the control actions subsequently alter the process state. For example, in a water treatment system, a PLC may start a pump to fill a tank with water. The pump must be stopped when the tank reaches a predetermined level. The level of water in the tank is known to the PLC through a level sensor. At any instant, the PLCs receive data from sensors, compute control actions, and apply these actions to specific devices commonly referred to as actuators.

CPS under cyber attack: The communications infrastructure of a CPS, often using wired or wireless communications, may be connected to an external network. Such connections however render a CPS susceptible to cyber attacks. Such attacks may compromise one or more of the communication links between sensors, actuators and the PLCs, as well as across the PLCs and Supervisory Control And Data Acquisition (SCADA) workstation. Each such link is considered as an attack point in the CPS. Once a link has been compromised, an attacker can use one of several strategies to send fake state (sensor) data to one or more PLCs, or bypass the PLC and directly control an actuator. Unless the defense mechanism of the attacked CPS is robust, such attacks are able to cause an undesirable response that may lead to system shutdown and/or device damage. Examples of such strategic attacks are provided below in the subsequent sections. Thus, it becomes imperative for design engineers of a CPS to understand how an attack might bring about anomalous behaviour and how these may be detected.

Problem setting: It is assumed that the CPS under attack consists of one or more stages where each stage is controlled by a PLC, and that PLCs are able to communicate over a network. Each stage of the CPS contains sensors and actuators, each referred to here as an entity. This general architecture of a CPS is found in water treatment plants and several other Industrial Control Systems (ICS) such as a power grid. It is to be appreciated that the terms ICS and CPS are used synonymously, and generally refer to a complex system such as a power grid or a water treatment system controlled by a collection of PLCs. Further, it is assumed that an attacker has access to any one or more stages and links of the CPS. Thus, the attacker is able to compromise one or more entities in any one or more stages to which access is available. This is a reasonable assumption as in a complex CPS, e.g., a public utilities plant, where PLCs are often distributed. While attacking more than one stage at the same time might be difficult, it is known to be feasible.

A stage is considered partially compromised if any one or more, but not all entities in that stage are compromised and completely compromised if all entities at that stage are compromised. Such attacks are referred to as single-stage single point when only one entity in a stage is compromised, or simply SSSP, single-stage multi point, or simply as SSMP when only one stage is fully compromised, multi-stage single point when multiple stages but only one entity in stage is compromised, or simply MSSP, and multi-stage multi point when more than one sensor in more than one stage are compromised, or simply MSMP attacks. Single stage single point (SSSP) attacks are the simplest of these four types of attacks. This generic attack scenario becomes realistic in the presence of system vulnerabilities or when a disgruntled insider, or an external malicious actor has access to one or more stages of the CPS either directly or via the Internet. The problem of attack detection can now be briefly stated as follows: What software mechanism will be able to detect SSSP, SSMP, MSSP, and MSMP attacks on a CPS?

It is noted that in a complex ICS, there are many ways of launching any of the attacks mentioned above (e.g. malicious manipulation of sensor data, or the status of actuators via a man-in-the-middle attack). For example in a water treatment system, the intention of each such attack is to cause a tank to overflow or a reduction in the performance measured as gallons of water produced per minute. For good order, it is further noted that attacks such as injecting malware into a PLC, denial of service and etc. are also other possible attack vectors that may lead to undesirable process behaviour.

One object of the present invention is therefore to address at least one of the problems of the prior art and/or to provide a choice that is useful in the art.

SUMMARY

According to a $1^{st}$ aspect of the invention, there is provided a method of detecting cyber attacks on a cyber physical system which includes at least one computing device coupled to at least one sensor and/or actuator for controlling a physical process. The method comprises: (i) deriving at least one invariant for the computing device, based on a system design of the system or computer code configured to control the system in relation to the physical process or data collected from the system during testing or operation of the system, the invariant defining a set of conditions that enable determination from the sensor and/or actuator regarding process anomalies of the physical process being controlled; (ii) configuring the invariant as corresponding computer code; and (iii) executing the invariant as the computer code on the computing device to monitor the physical process via the sensor and/or actuator and detect the process anomalies for detecting the cyber attacks.

Advantageously, the method enables cyber security to be considered and incorporated into the cyber physical system at the early stage of design, and prior to a plant (in which the cyber physical system is to be arranged) is even built or is placed into full operation, i.e. achieving security by design. Therefore, the proposed method allows the design itself to include cyber security considerations and protection against cyber attacks at the outset.

Preferably, the invariant may be a state-dependent invariant.

Alternatively, the invariant may preferably be a state-agnostic invariant.

Preferably, the invariant may be derived as a mathematical relationship involving inputs and/or output variables of the sensor and/or actuator used in controlling the physical process.

Preferably, the at least one computing device may include a plurality of computing devices respectively coupled to respective at least one sensor and/or actuator, and wherein step (i) may include deriving respective invariants for the respective computing devices.

Preferably, the plurality of computing devices may include being communicatively coupled to a communication network of the cyber physical system.

Preferably, the computing device may include a programmable logic controller.

Preferably, the cyber physical system may be arranged to be part of a water treatment plant, a waste-to-energy plant, a transportation control centre, an oil and gas production plant, or a power grid.

Preferably, step (iii) may further include retrieving measurements from the sensor and/or actuator, and matching the retrieved measurements against the set of conditions defined in the invariant to detect the anomalies in operation of the sensor and/or actuator.

Preferably, the system design of the system may be provided in the form of a plurality of state condition graphs or design diagrams.

Preferably, the design diagram may be a process and instrumentation diagram or a line diagram (along with design specifications in textual or graphical form).

Preferably, the configured computer code of the invariant may be programmatically integrated with control code of the computing device.

It should be apparent that features relating to one aspect of the invention may also be applicable to the other aspects of the invention.

These and other aspects of the invention will be apparent from and elucidated with reference to the embodiments described hereinafter.

BRIEF DESCRIPTION OF THE DRAWINGS

Embodiments of the invention are disclosed hereinafter with reference to the accompanying drawings, in which:

FIG. 4 is a table listing sensors, actuators and state variables used in attack detection experiments on the SWaT of FIG. 3;

FIG. 6 is a table listing state dependent invariants for attack detection;

FIG. 8 is a table listing single stage multi-point attack scenarios and attacks on stages 1 and 3 of the SWaT of FIG. 3.

DETAILED DESCRIPTION OF PREFERRED EMBODIMENTS

1. Introduction

Figure 1:
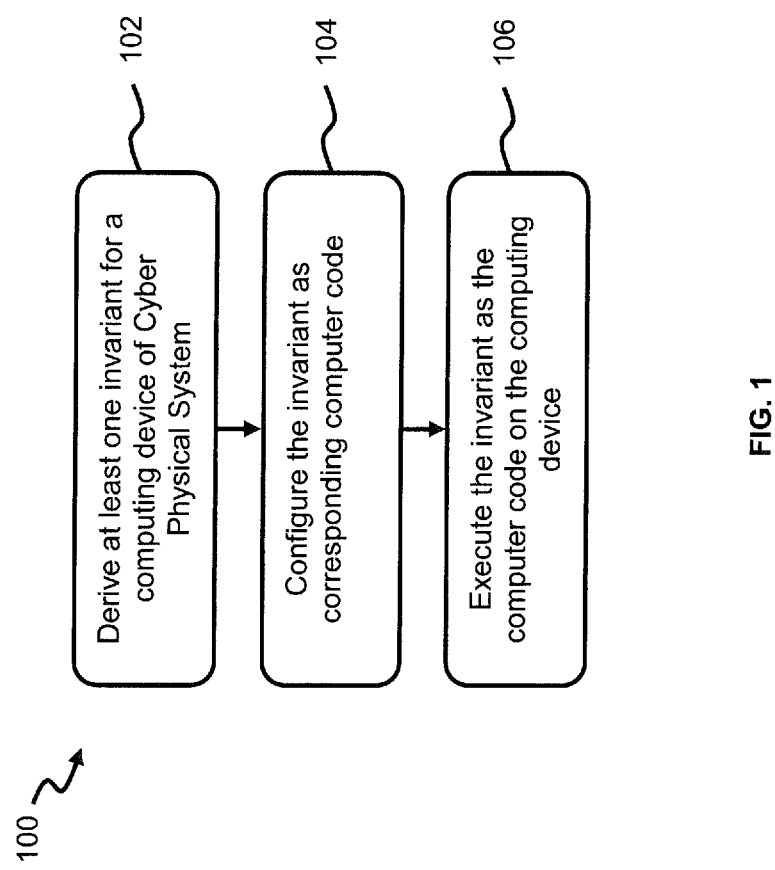
FIG. 1 is a flow diagram of a method of detecting cyber attacks on a cyber physical system, according to an embodiment.

With reference to FIG. 1, a proposed method 100 of detecting cyber attacks on a cyber physical system (CPS), in which the system includes at least one computing device (e.g. a PLC) coupled to at least one sensor and/or actuator for controlling a physical process, is disclosed according to an embodiment. The method 100 broadly comprises: (at step 102) deriving at least one invariant for the computing device, based on a system design of the system (e.g. a P&ID diagram) or computer code configured to control the system in relation to the physical process or data collected from the system during testing or operation of the system, the invariant defining a set of conditions that enable determination from the sensor and/or actuator regarding process anomalies of the physical process being controlled; (at step 104) configuring the invariant as corresponding computer code; and (at step 106) executing the invariant as the computer code on the computing device to monitor the physical process via the sensor and/or actuator and detect the process anomalies for detecting the cyber attacks. To clarify, step 106 may further include retrieving measurements from the sensor and/or actuator, and matching the retrieved measurements against the set of conditions defined in the invariant to detect the anomalies in operation of the sensor and/or actuator. Then, the CPS may be part of a water treatment plant, a water distribution plant, a waste-to-energy plant, a transportation control centre, or an oil and gas production plant. Also, in some instances, the CPS may further be controlled by remote terminal units (RTUs).

In one example, the method 100 (which is a distributed detection method) is arranged to detect single stage multi-point (SSMP) attacks on a CPS. Such attacks aim at compromising two or more sensors or actuators at any one stage of a CPS, and could totally compromise a controller and prevent the controller from detecting the attack. However, as demonstrated in experiments (to be explained in Section using the flow properties of water from one stage to the other, a neighbouring controller was found effective in detecting such attacks. The method 100 is based on physical invariants derived for each stage of the CPS from its design.

The attack detection effectiveness of the method 100 was evaluated experimentally against an operational water treatment testbed containing 42 sensors and actuators. Particularly, results from the experiments point to high effectiveness of the method 100 in detecting a variety of SSMP attacks. Additional experiments also point to high effectiveness in detecting other types of attacks mentioned above such as SSSP, MSSP, and MSMP. Distributing the attack detection code among various controllers thus adds to the scalability and effectiveness of the proposed method 100.

Detailed explanation for the said method 100 will be provided in the various sections below. Specifically, Section 2 presents a model of CPS for the application of distributed attack detection (also referred to as DaD). An overview of a water treatment system, necessary to aid understanding of the remainder sections, is also provided in Section 2. Invariants are then defined in Section 3. Attacker model, attack scenarios, and attacks considered in the experiments are set out in Section 4. Results from the experiments are given in Section 6. A summary, discussion, two open problems, and the next development steps for future improvement of the method 100 appear in Section 7.

2. Modelling a CPS

To realise the method 100, the first step is to construct a suitable model of a CPS. A general architecture of a CPS and the modelling procedure based on this architecture, are described next.

2.1 Structure of a CPS

Figure 2:
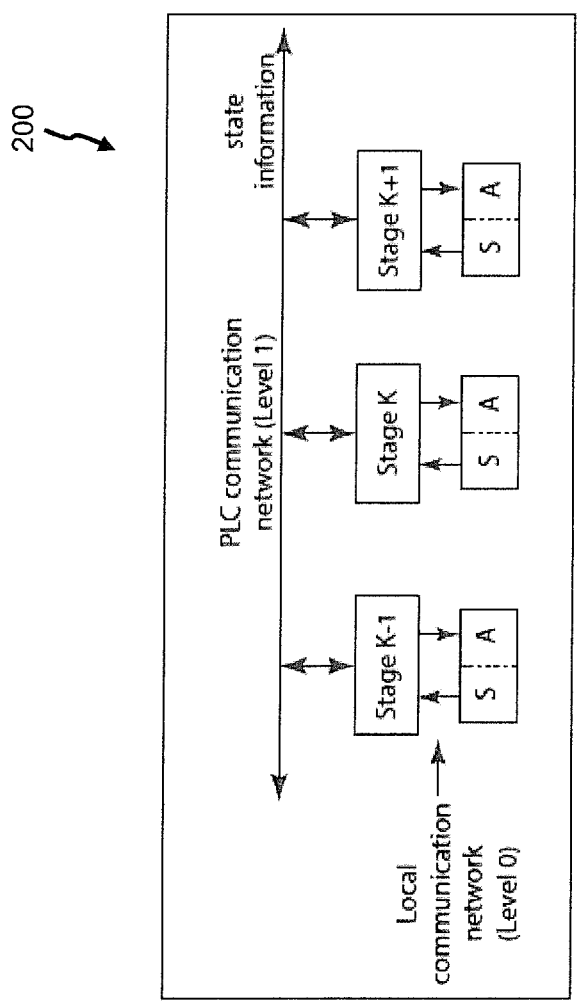
FIG. 2 shows a generic architecture of a communications architecture of the control portion of a multi-stage Industrial Control System (ICS)

CPS, such as power grid and water treatment systems, consists of a distributed supervisory control system (which also may be individually controlled by a master controller typically known as a SCADA). The control system itself is a collection of stages each controlling a specific portion of the CPS. It is assumed that each stage has one Programmable Logic Controller (PLC) responsible to control the subprocess associated with that stage. It is to be appreciated that PLCs are generally programmable in a variety of suitable programming languages such as ladder logic, structured text, and functional blocks. This architecture 200 is exhibited in FIG. 2. As shown, the PLC at each stage communicates with a set of sensors and actuators, labelled as S and A respectively in FIG. 2, via a local communications network. This local network is considered to be at Level 0 and is also referred to as the field-bus network. It could be, for example, a ring network across which sensors send local state information to the PLCs, and the PLCs in turn send control command to the actuators. It is to be noted that state information is local to a stage, i.e., to a PLC. However, with additional wiring, or using wireless communications, sensors could also send data to other PLCs. Level 1 network is used to share state data among the PLCs. Control commands to alter the state of an actuator are sent to actuators by the respective PLCs. Actuators often contain sensors used by a PLC to obtain its state. Such sensors are included in set S shown in FIG. 2. The PLCs themselves communicate among each other using the Level 1 network.

Each PLC contains a control program that receives data, computes control actions and applies these to the actuators it controls. Computation of control actions is based on a condition evaluated using data received from the sensors. This could be a simple condition involving data from one sensor, or a compound condition involving data from multiple sensors some of which may require communication with other PLCs.

2.2 Testbed Architecture

Figure 3:
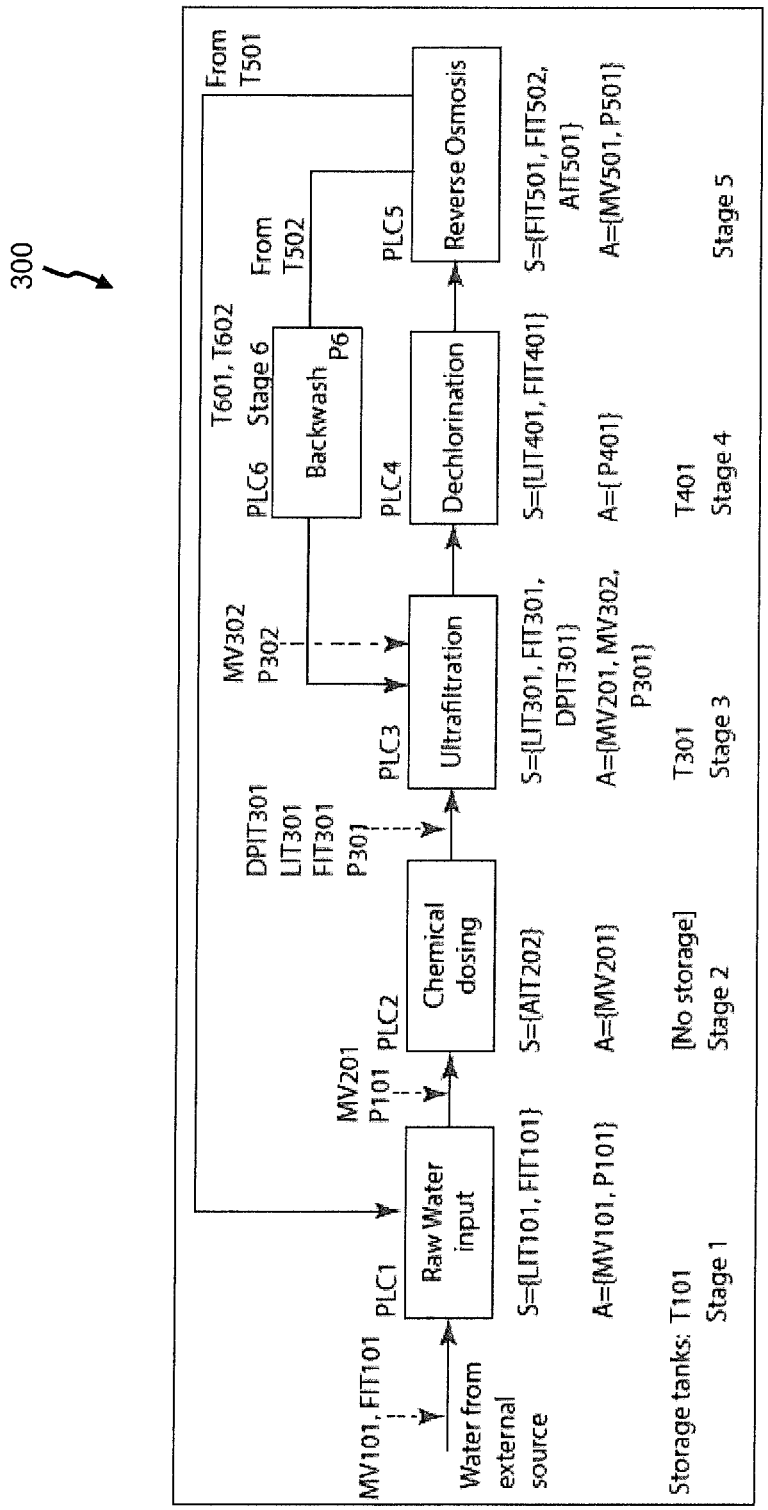
FIG. 3 shows schematics of six stages in a Secure Water Treatment (SWaT) plant with corresponding PLCs, sensors, and actuators.

An operational water treatment plant, referred to as SWaT, was used to conduct experiments discussed here (and so the proposed method 100 may appropriately be named as "WATER-DEFENSE", under such a context). SWaT is hosted at Singapore University of Technology and Design (SUTD), Singapore. SWaT produces 5 gallons/hr of filtered water, and mimics a large modern water treatment plant found in cities. As shown in the schematics 300 of FIG. 3, SWaT consists of six stages labelled 1 through 6. Each stage is controlled by its own set of dual PLCs, one serving as a primary and the other as a backup in case of any failure of the primary. It is to be appreciated that only the leftmost four stages shown in FIG. 3 are used in the case study discussed here. The attack detectors described in Section 5.2, are placed inside PLC1 through PLC4; PLC5 and PLC6 were not used in this case study. There are five water storage tanks as shown, and are labelled as "Txxx". The corresponding level indicator labeled as "LITxxx" in FIG. 3 measures water level in each tank. For the interested reader, further details of SWaT components including sensors and actuators, can be found in the document titled: "*SWaT: Secure Water Treatment Testbed, 2015*", which is hosted on SUTD's iTrust webpage.

Communications: Each PLC obtains data from sensors associated with the corresponding stage, and controls sensors and actuators in its domain. Turning the pumps ON, or opening a valve, causes water to flow either into or out of a tank. Level sensors in each tank inform the PLCs when to turn a pump ON or OFF. Several other sensors are available to check the physical and chemical properties of water flowing through the six stages. PLCs communicate with each other through a separate network; both wired and wireless modes of operation are available.

Stages in SWaT: Stage P1 controls the inflow of water to be treated by opening or closing a valve that connects the inlet pipe to the raw water tank. Water from the raw water tank is pumped via a chemical dosing (stage P2) station to another Ultrafiltration (UF) Feed water tank in stage P3. In stage P3 a UF feed pump sends water, via UF unit, to a Reverse Osmosis (RO) feed water tank in stage P4. In P4 an RO feed pump sends water through an ultraviolet dechlorination unit controlled by a PLC in stage P4. This step is necessary to remove any free chlorine from the water prior to passing it through the reverse osmosis unit in stage P5. Sodium bisulphate (NaHSO3) can be added in stage P4 to control the Oxidation Reduction Potential (ORP). In stage P5 the dechlorinated water is passed through a 2-stage RO filtration unit. The filtered water from the RO unit is stored in the permeate tank and the reject in the UF backwash tank. Stage P6 controls the cleaning of the membranes in the UF unit by turning ON or OFF the UF backwash pump. The backwash cycle is initiated automatically once every 30 minutes and takes less than a minute to complete. Differential pressure sensors in stage P3 measure the pressure drop across the UF unit. A backwash cycle is also initiated when the pressure drop exceeds 0.4 bar indicating that the membranes need immediate cleaning. A differential pressure meter, installed in stage P3, is used by PLC3 to obtain the pressure drop across the UF unit.

Sensors and actuators: In all, SWaT consists of 42 sensors and actuators distributed across the six stages. These include sensors that relate to the physics of the process such as water level in tanks, flow indicators, and pressure indicators. In addition there are sensors that measure chemical properties of water including pH, conductivity and hardness. Each PLC has its own set of sensors and actuators connected through a ring network. Thus, when a PLC needs to obtain state information from another PLC, it must request such information via a suitable command; the requested data is sent over the Level 1 network.

Attack points in SWaT: An attack point is a specific component or a communication link. In this case study, only the wireless links between sensors and the corresponding PLCs are considered as attack points. A pessimistic approach is taken implying that all wireless links are assumed to be vulnerable to cyber attacks. Initial experiments, not described here, revealed that indeed, wireless communications in SWaT are vulnerable. A table 400 as shown in FIG. 4 lists the sensors and actuators in SWaT used in the study discussed here.

2.3 Sensor and Actuator Sets

The (attack detection) method 100, described in Section 5.2 below, uses state-based invariants. The variables used in the invariants are listed in the table 400 of FIG. 4. The output of sensor i and the state of actuator j, are represented by, respectively, state variables $v_i$ and $v_j$. For example, from the table 400, $v_2$ denotes the state of sensor LIT101 that indicates the level of water in tank T101. Similarly, the state of pump P101 is indicated by variable $v_4$.

An ideal flow meter would report the flow rate as 0, when no water flows through the pipe to which the meter is connected. However, in practice, the output of flow meters used in SWaT was found to be greater than 0, even when no water was flowing through the pipe. Hence, the condition "no flow" was checked using parameter δ>0. δ was determined experimentally to ensure that the "no flow" and "flow" states as in the table 400 were determined correctly. Each tank is assumed to be in any of the following four states: very low (LL), low (L), high (H), and very high (HH). These states are based on the water level in each tank and are known to the corresponding PLC.

With respect to a PLC, each sensor and actuator is categorized as an input (i), output (o), or input-output (io) entity as indicated in the table 400. A sensor is considered an input (output) for a PLC if it measures some property of water input to (output from) that stage. Level sensors are considered both input and output as the water flows into and out of a tank. An actuator could be input for a PLC and output for another PLC. For example, pump P101 is categorized as output for PLC1 because it sends water from stage 1 to stage 2. The same pump is categorized as an input actuator for PLC3 because in its ON state the pump sends water to stage 3 controlled by PLC3.

3. Invariants

A "process invariant," or simply an invariant, is a mathematical relationship defined among "physical" and/or "chemical" properties of the process controlled by the PLCs in a CPS. Together, at a given time instant, a suitable set of such properties constitutes the observable state of SWaT. For example, in a water treatment plant, such a relationship includes the correlation between the level of water in a tank and the flow rate of incoming and outgoing water across this tank. The properties are measured using sensors during the operation of the CPS and captured by the PLCs at predetermined time instants. The measurements are often also saved in a historian (e.g. a workstation) for subsequent analysis. In this embodiment, an invariant in SWaT, derived from physical, not chemical, properties is considered for detecting cyber attacks. So put simply, an invariant is a specific rule/condition aimed at detecting an anomaly in the behaviour of the underlying process controlled by a CPS.

Two types of invariants were considered: state dependent (SD) and state agnostic (SA). While both types use states to define relationships that must hold, the SA invariants are independent of any state based guard, whereas SD invariants are. An SD invariant is true when the CPS is in a given state; an SA invariant is always true.

3.1 State-Dependent (SD) Invariants

First, as an example, consider the fact that when the motorized valve MV101 is open, the flow rate indicator FIT101 must be non-zero. In terms of the variables listed in the table 400, this invariant can be written as follows.

$$v_3=1 \rightarrow v_1 > \delta \quad (1)$$

In general, an SD invariant will be written as follows:

$$S_1 \rightarrow S_2, \quad (2)$$

wherein $S_1$ and $S_2$ denote state-based conditions of one or more components of CPS, such that $S_2$ must hold whenever $S_1$ holds. Such conditions could be on a portion of the system state or the complete state. In this embodiment, most conditions are on the states of only a few components of the system. In Equation (1), $S_1$ is $v_3=0$ and $S_2$ is $v_1>\delta$.

Figure 5:
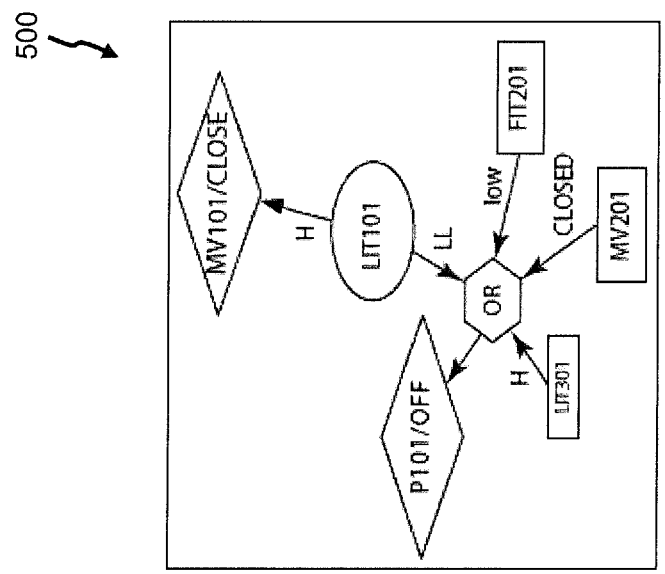
FIG. 5 is a partial State Condition Graph for stage 1 of the SWaT of FIG. 3.

Derivation of SD invariants is based on the system design of the CPS, and its various components. The system design is captured using State Condition Graphs (SCG), but not limited to only as such. An SCG could be constructed at the design stage of a CPS, before the control code is available, or later. A sample SCG 500 for pump P101 and motorized valve MV101 is shown in FIG. 5 to aid in understanding how the SD invariants are derived. Particularly, the sample SCG 500 captures the conditions when pump P101 must be OFF and motorized valve MV101 must be CLOSED. State "low" for FIT implies that there is either no flow or the flow rate is much lower than expected, and hence the pump must be turned off. The following two SD invariants are derived from the SCG in FIG. 5 and the state variables in the table 400.

$$v_2 = \text{``}LL\text{''} \rightarrow v_3 = 1; \text{ for } MV101 \quad (3)$$

$$(v_5 = \text{``}H\text{''} \text{ or } v_8 = 0 \text{ or } v_{14} \leq \delta) \rightarrow v_4 = 0; \text{ for } P101 \quad (4)$$

It is noted that an SD invariant can include conditions from across the various stages of a CPS. However, doing so could make an invariant complex and require significant amount of sensor data exchange across the PLCs. Thus, in the current embodiment, and as mentioned below in Section 5.2, the SD invariants use only variables from neighbouring stages of SWaT.

3.2 State-Agnostic (SA) Invariants

Under normal system operation, an SA invariant must be always true regardless of the system state. In experiments to demonstrate the effectiveness of the proposed (attack detection) method 100, one SA invariant was derived for each tank in SWaT to detect SSMP attacks that affect the flow of water into and out of a tank. These invariants are based on the flow of water and water level in a tank, and hence are identical in terms of the mathematical relationship that they capture. An SA invariant for tank T101 is derived next.

Let x denote property p and y its measurement obtained from a sensor. y(k) denotes the sensor measurement for x(k) at instant k. $\hat{x}(k)$ is an estimate of x(k). In the absence of sensor errors and no cyber attacks, $\hat{x}(k)=x(k)=y(k)$. The water level in a tank, say T101, was considered as p. The level in T101 is measured by sensor LIT101 (see FIG. 3). Sensors FIT101 and FIT201 measure, respectively, water flow into and out of T101. These flow rates are denoted as $u_i(k)$ for inflow, and $u_o(k)$ for outflow.

At time instant k+1, the water level in T101 depends on the level at time k and the inflow and outflow at instant k. This relationship is captured in the following idealized model of the tank:

$$x(k+1)-x(k)=\alpha(u_i(k)-u_o(k)), \quad (5)$$

where perfect sensors are assumed in Equation (5). To derive a practically usable invariant, SWaT was run several times without any attacks to estimate the mean $\mu_d$ and the standard deviation $\sigma_d$, where $d=(\hat{x}(k)-y(k))$ over several runs, i.e., the mean and variance of the difference between the estimated tank level $\hat{x}(k)$ and its measured value y(k). Based on Equation 5, the statistics obtained experimentally, and converting the true states to their estimates, the following conditions were derived to test whether or not sensor LIT101 is under attack.

$$\frac{\sum_{i=1}^{n}(\hat{x}(i)-y(i))}{n} > \epsilon, \text{ under attack}, \quad (6)$$

$$\leq \epsilon, \text{ normal.} \quad (7)$$

In the conditions above defined in Equations (6) and (7), which is an invariant to detect attacks on sensor LIT101, the average of the difference between the estimated and the measured tank levels is tested against ε. Thus, a decision whether or not sensor LIT101 is under attack is taken from n sensor readings. Selection of n ought to be done carefully as it impacts the detection effectiveness. In the experiments, n was set to 10. As described earlier, based on trial runs of SWaT without attacks, ε was set to 0.55.

4. Attacker Models and Attacks

For a CPS, an attacker model is a pair (T, O), where T an attack type to realize an objective O. It is to be appreciated that an attacker may be an insider of the CPS (i.e. affiliated therewith), or an outsider to the CPS. The experiments conducted, as described herein, assume that the attacker has partial or complete knowledge of the design and operation of the targeted stage of a multi-stage water treatment process (e.g. SWaT). The attack type could be of any of the suitable types proposed earlier in related literature. The objective is specified as a statement. For example, "Damage generator A in a power grid", or "Damage pump P302 in a water distribution network". A cyber attack is a sequence of actions initiated by the attacker where each action relates to one or more physical or cyber components in the CPS. The actions are selected and sequenced so as to model the attack type T and realize objective O. Whether the attempted action sequence will realize the objective depends primarily on the defense mechanism used in the CPS and knowledge and technical proficiency of the attacker in designing and launching the attack.

Figure 7:
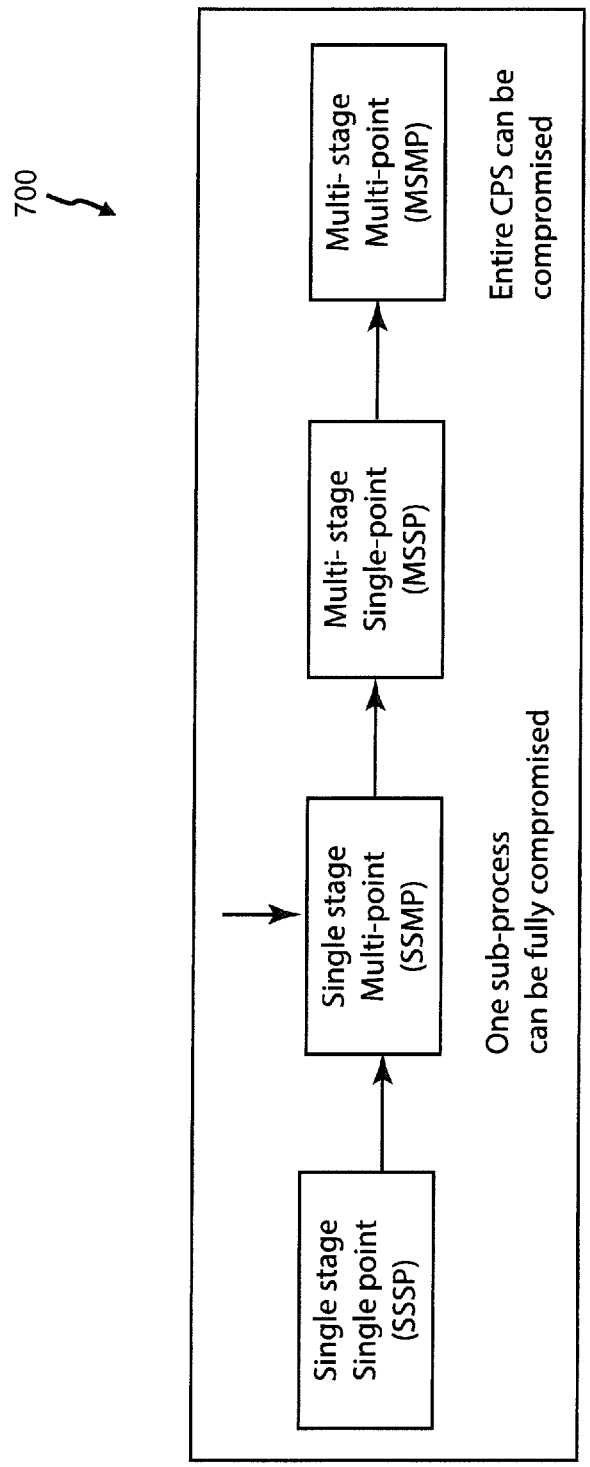
FIG. 7 shows different attack types and sequence of experiments designed to understand the impact of cyber attacks on a Cyber Physical System (CPS)

The work discussed in this embodiment is one in a series of experiments designed to understand the impact of attacks on a CPS and the effectiveness of various detection methods. FIG. 7 shows a diagram 700 of four sets of experiments conducted with the long-term goal of understanding the best attack detection mechanisms that may practically be deployed to enhance the resilience of a CPS. It is to be noted that the attack types in FIG. 7 fall under the generic attack model presented here. For example, SSMP, as marked by an arrow in FIG. 7, is a type in T and can be used to derive a multitude of attacks with various objectives in O.

Example 1: Consider the following attacker intent and attack type for the system in FIG. 3: Cause tank T101 to overflow using a deception attack. The attacker takes the following actions in an attempt to realize the intent.

1. Enter and capture: Identify and capture the wireless communication link LIT101 to PLC1. LIT101 sends the level of tank T101 to PLC1. As shown in the table 400, T101 can be in any one of the four states LL, L, H, HH that respectively correspond to water level being very low, low, high, and very high.
2. Wait and listen: Listen to the data transferred across the links. Wait until Pump P101 is ON, the valve MV101 is C(losed), and T101 is close to entering the HH state, say, when it is in state H.
3. Deceive: Regardless of the data input from the LIT101 send to PLC 1 a value that corresponds to H.
4. Wait and listen: Continue monitoring the LIT101 until a few minutes after it outputs a value that corresponds to HH. An overflow will occur if the pump has not been shut sometime after T101 moves to HH. The exact time when the overflow occurs depends on the excess capacity in T101 beyond that needed in HH.
5. Exit: Exit from the system when satisfied that the overflow has occurred.

The above sequence of steps was used to launch attacks in the experiments described here.

4.1 Attack Scenarios

A set of SSMP attacks were designed based on attack scenarios listed in a table 800 depicted in FIG. 8. The scenarios are categorized as follows based on the attacker knowledge.

A1. Input sensors
A2. Input and output sensors
A3. Input actuators
A4. Input and output actuators
A5. Input and output sensors, and actuators (stage fully compromised)
A6. Input and output sensors, input actuators (stage nearly fully compromised)

In each scenario the objective of the attacker is to either cause a tank to overflow and/or reduce the system performance measured in terms of gallons of treated water produced per minute. For example, in A1, the attacker focuses exclusively on, and has the knowledge of, the sensors classified as input for a given PLC. By the phrase: "has knowledge of a component C", it is meant that the attacker knows: (a) of the presence of C and its context in the CPS, (b) details of the physical and logical operation of C, and (c) how to actually compromise C to send fake data to the corresponding PLC or a command to C bypassing the PLC.

4.2 Attacks

The above mentioned six attack scenarios were realized in terms of attacks listed in the table 800. For the purpose of the experiment to assess the effectiveness of DaD, these attacks were launched, one at a time, in stages 1 and 3. A sample attack is described in the following example.

Example 2: To understand the attack scenarios enumerated in the table 800, consider stage 1 of SWaT and attack scenario A1. As shown in FIG. 3, this stage consists of tank T101 and several sensors and actuators. The goal of PLC1 is to ensure that there is enough water in T101 to be supplied to stage 3 for ultrafiltration. Thus, the control algorithm in PLC1 monitors water level in T101 at predetermined intervals. When water level in the tank is low, indicated by sensor LIT101 ($v_2$=L), PLC1 opens valve MV101 ($v_3$), so water can enter T101. The flow rate indicator, FIT101 ($v_1$), is used by PLC1 to check whether water is flowing into tank T101.

Consider the case when $v_2$=L, and the attacker takes control of the links from LIT101 and FIT101 to PLC1. The attacker then sets $v_2$=H, so PLC1 would not open MV101. If at this time P101 is ON, i.e., $v_4$=1, water will be drained from T101 and eventually the tank will be empty. If there is no cut off in P101 then the pump could be running dry and might get damaged. In any case, depending on the state of tank T301, no water in T101 will eventually lead to $v_5$=LL, thus stopping the UF process. In turn this may lead to stopping of the RO unit. The net impact of this attack would be to reduce the amount of water produced by the plant. Note, however, that if $v_4$=1 then $v_2$ must eventually reach state L. The attacker makes the assumption that PLC1 is monitoring $v_2$ and hence also changes the actual water level sent to PLC1 via LIT101. Thus, PLC1 does not detect any anomaly in the water level in T101. Other attacks are also possible that may involve changing the value of $v_1$ and that of $v_2$ and $v_3$ to cause either overflow in T101, or a reduction in the amount of water produced/minute.

Example 2 illustrates how a variety of attacks can be designed in each of the scenarios listed in the table 800. The impact of these carefully designed attacks could be tank overflow, pump damage, or system performance degradation. For PLC1 and PLC3 a total of, respectively, 36 and 104 attacks were designed and launched systematically one by one to study the effectiveness of the proposed detection method 100.

Several attacks were generated using the six scenarios mentioned earlier. Each attack manipulated one or more actuators and sensors. To limit the total number of attacks, the actuator states were set to 0 or 1, depending on their current state while simultaneously manipulating the level sensor in some cases. The total number of such attacks possible for each scenario and for each of the two PLCs is given in the table 800.

The number of attacks actually implemented was smaller than the total possible so as to complete the experiments within a reasonable time frame. While launching an attack is relatively straightforward as there is access to the entire system for the purpose of the experiments, bringing the system to a suitable state prior to launch is however time consuming due the existence of various tanks whose states are from a previous experiment by some users of the testbed. Several trial experiments, not reported here, as well as a large number of experiments performed for SSSP attack detection were conducted to determine which attacks to select from the complete set. Attacks that correspond to transient states were omitted as these require a much longer setup time than those launched when the system is in a stable state. Entries in the rightmost column of the table 800 are explained in the following example.

Example 3: Consider the following attack on PLC1 derived from scenario A5.
1: FIT101, FIT201, MV101, P101: (1010→0101)

The bits in the binary pattern above correspond, from left to right, to the sensors/actuators listed. This attack assumes that the input flow rate indicator is showing inflow into tank T101 (FIT101 is set to 1), there is no outflow (FIT201 is set to 0), valve MV101 is OPEN (1) and pump P101 is OFF (0). The attacker compromises both sensors and actuators and inverts the states of each. Thus, FIT101 is showing no inflow (set to 0), FIT201 is showing outflow (set to 1), MV101 is CLOSED (0) and pump P101 is ON (1). Note that in this case the states of FIT101 and MV101 and the states of FIT201 and P101 are locally consistent when prior to and after the attack is launched. Thus, a simple local inconsistency check will not be able to detect this attack. To also clarify the context of "locally consistent", it is to be appreciated that stable states p and q of components a and b, respectively, are considered locally consistent if, by design, p always corresponds to q and vice versa. Components a and b could be in locally inconsistent states due to failure of one or both. It is also possible that while the components are in locally consistent states, an attacker makes them appear to be not so to the corresponding PLC.

Example 4: Attacks derived from scenarios A1, A2 and A6 manipulate the level sensor LIT. To understand how and why this is done, consider the following attack in A6.
1: LIT101, [MV101, FIT101, FIT201]: (001→011)

Prior to the attack valve MV101 is CLOSED (0), FIT101 is indicating no flow into tank T101 (0), and FIT201 is indicating flow out of T101 (1). Note that the states of MV101 and FIT10 are locally consistent. As water is flowing out of T101, P101 must be ON. However, this aspect is not considered explicitly in the attack. The attacker does not change the state of MV101 (0) and FIT201 but changes that of FIT101 to indicate that there is flow into T101. A local inconsistency check would detect this attack, though it is assumed that such checks are not in place.

To avoid detection, the attacker also manipulates LIT101. Thus, because FIT101 is indicating flow, the attacker changes the value of LIT101 to be consistent with the flow into T101, as well as flow out of T101 due to P101 being ON. This is a traditional replay attack and requires that the attacker knows exactly how to compute, in real time, values of LIT101. Unless the attack is detected, T101 will be empty while P101 remains ON. This situation could lead to pump damage and reduction in system performance. The latter condition may arise if the attack is not detected before T301 becomes empty and UF unit is turned OFF.

5. Experiments

A limited set of attacks was selected from the list in the rightmost column in the table 800. The number of attacks launched is also listed in the same table 800. Attacks that correspond to transient states were not launched. It is to be noted that such attacks are important and, as has been reported earlier in associated literature, are difficult to detect.

However, it was decided to consider these attacks in a separate experiment devoted entirely to attacks that exploit the transient state(s) of a CPS. For the experiments, the algorithms developed in WATER-DEFENSE are to be implemented in the language supported by the specific PLCs adopted. In this case, the experiments to assess the technology were conducted using Allen Bradley PLCs, which were programmed using the programming languages: ladder Logic and structured text; both these languages are defined under the IEC 61131-3 standard.

5.1 Attack Procedure

To understand the proposed method 100, it is important to understand the entire procedure used in the experiments to assess the effectiveness of DaD. The following is a general description of the entire set of experiments reported herein.
1. Create an attacker model. The attacker model described in Section 4 served as a basis for generating SSMP attacks.
2. Generate a set A of attacks to be launched. For each attack, create a procedure to use for launching it and observing the outcome (attacks listed in the rightmost column of the table 800.
3. Design process invariants for use in DaD (as in Section 3).
4. Code each process invariant, and add it to the appropriate PLC.
5. Select an attack from A and launch it using the procedure in Step 2. Record whether the attack is detected or not. Launching an attack may require bring the CPS to a specific state before the attack is launched.
6. Repeat step 5 until all attacks in A have been tried.

The above procedure is generic and is perhaps applicable to any CPS. Indeed, one needs to take extreme care in executing Step 5. This step must be executed with a careful analysis of the expected behaviour of the CPS, in the event the attack is not detected or detected after damage has occurred. While possible, in all likelihood, the experiment described here will not be conducted on a live public infrastructure.

5.2 Distributed Attack Detection

The invariants serve as checkers of the system state. These are coded and the code placed inside each PLC used in attack detection. It is highlighted that the checker code is added to (i.e. programmatically integrated with) the control code that already exists in each PLC. The PLC executes the code in a cyclic manner. In each cycle, data from the sensors is obtained, control actions computed and applied when necessary, and the invariants checked against the state variables or otherwise.

It is important to note that the above procedure is independent of the CPS to which it is applied, though the invariants used are derived from a specific system, namely, SWaT. Thus, the above procedure may also be applicable to other similar distributed systems that can be partitioned into multiple stages and have localized sensors and actuators at each stage.

6. Results

The SD and SA invariants together were able to detect all attacks and thus proved to be a powerful means for detecting attacks using DaD. For attacks in A1 and A2, the SD invariants were found to be most effective, while for the remaining attacks both SA and SD invariants were useful. Further, attacks were detected almost immediately after they are launched.

It is important to understand why the distributed nature of detection is a powerful mechanism. First note that the stages are connected in a sequence. Thus, any anomaly in stage 1 has a very high likelihood of being reflected in stage 3; stage 2 only has chemical sensors and hence requires chemistry-based detection method. Now consider invariant P3BC1 listed in a table 600 (shown in FIG. 6), and the attack that attempts to degrade system performance by turning P101 OFF when T301 is low on water. If this attack is not detected, then the UF unit will be turned OFF and eventually the RO will also be turned OFF because water will stop flowing from T401 to RO. However, the attack is detected by PLC3, because if T301 is low ($v_5$=L) then P101 must be ON ($v_4$=1) and MV201 must be OPEN ($v_8$=1). It is noted that MV201 is located at the pipe that connects P101 to T301.

Arguments similar to the one above could be given to explain how each of the attacks was detected. Given the surprising nature of the results, it is natural to ask: "What kind of attacks could not be detected by the (distributed detection) method 100 implemented in the experiments"? The following replay attack was designed to answer this question. Suppose that the attacker performs the following actions when $v_2$(LIT101)=HH, i.e., tank T101 is full, and $v_4$ (P101)=0: (a) Compromise LIT101. (b) Send to PLC1 $v_2$(LIT101)=LL. This action causes PLC1 to open MV101 to ensure that T101 has adequate amount of water for the UF unit to continue functioning. To avoid PLC1 detecting the attack, the attacker computes new values of LIT101 based on the knowledge of flow rate into T101 when MV101 is open. The attacker can obtain the flow rate information from the specifications of the design of stage 1, or, could compromise FIT101 and obtain the information in real time.

Figure 9:
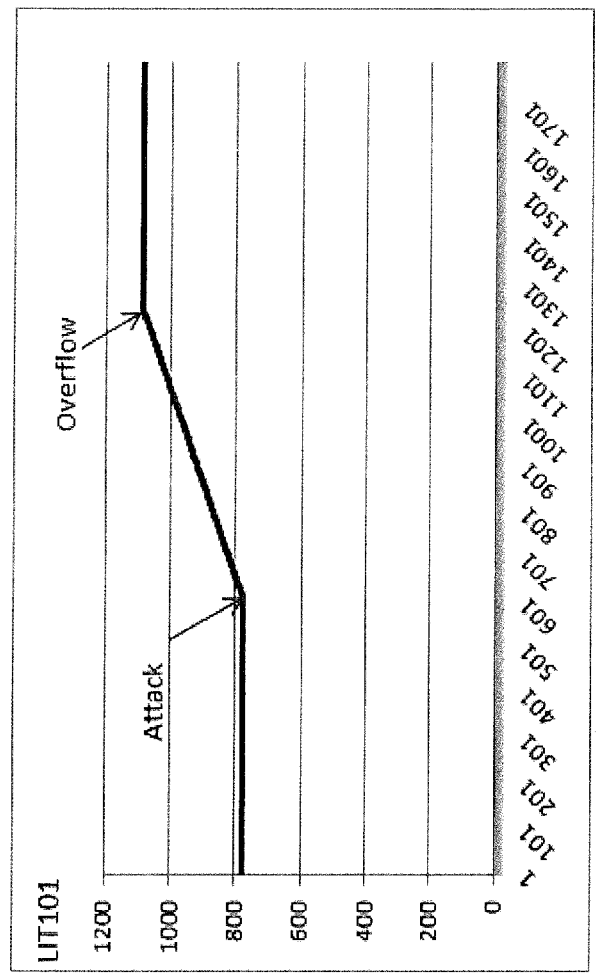
FIG. 9 is a graph depicting a water level in tank T101 versus time, in which tank T101 overflows due to an undetected replay attack in stage 1 of the SWaT of FIG. 3.

The above replay attack was implemented with all detectors in place. The attack was not detected causing T101 to overflow (i.e. each tank in SWaT has an overflow drain, hence the attack causes water wastage; the laboratory is not messed up). The water level before and after the attack is depicted in a graph 900 in FIG. 9. One way to detect this attack would be to keep track of previous state of LIT101. Let $q_{-1}$ and $q_0$ respectively denote the previous and current values of $v_2$, i.e., the tank level, just prior to the attack (−1) and at the time of attack. In the absence of the attack $q_{-1}=q_0$, because $v_3$(MV101)=0. Thus, the invariant in this case becomes:

$$v_3=0 \text{ and } q_{-1}=HH \rightarrow q_0=HH.$$

The above invariant installed in PLC1 would detect such a replay attack. Several other ways of detecting replay attacks are possible. Further, when a process stage has both the previous and the next stages as its neighbours, such attacks could be detected using DaD; there is no previous stage for stage 1 in SWaT and hence the replay attack in stage 1 goes undetected using the disclosed method 100 of this embodiment.

7. Summary, Discussion, Next Steps

The proposed method 100 to detect cyber attacks on a CPS is described in this embodiment, with reference to FIG. 1. The method 100 makes use of invariants, derived from CPS design, to detect cyber attacks. Each invariant is based on the physics or the chemistry of the process controlled. In this embodiment, only physics-based invariants were used (but is however not to be construed as limiting in any manner). The CPS is assumed to be structured so that it can be partitioned into interacting stages where each stage is controlled by a PLC that communicates with its local sensors and/or actuators, as well as with other PLCs and the SCADA workstation. The invariants are integrated into (with the control code of) the PLCs that control various sub-processes in a CPS. This method of attack detection is referred to as distributed attack detection or simply DaD.

As mentioned, the method 100 is deployable to detect cyber and physical attacks in (for example) water treatment plants, which are found in nearly every large city that serves people. Conventionally, the state of the art in the design and construction of these plants focuses only on the reliable operation of the plants to meet customer requirements; cyber security is often not considered at the design stage of the plants. However, news of successful cyber attacks, or regulatory requirements, tend to lead plant owners to later add cyber security measures in the plants to guard against future potential cyber attacks. In this respect, the method 100 brings cyber security considerations and implementation at the early stage of design, and before a plant is built or is placed into full operation, beneficially enabling security by design. Thus, the proposed method 100 allows the design itself to include cyber security considerations and protection against cyber attacks. Notwithstanding afore discussed, invariants may also be generated using machine learning techniques, when a plant is undergoing operational testing. The so generated invariants could then be added to one or more computing devices in the plant for attack detection.

To reiterate, the method 100 specifically comprises the following steps, where at below, C denotes an ICS or a CPS (which includes a plurality of PLCs or RTUs) that needs to be upgraded with programming logic to protect against multi-point cyber attacks.

1. Identify all sensors and actuators in C. This step may be completed with design of the CPS/ICS as a reference.
2. Derive state-dependent invariants. It is to be appreciated that the invariants are alternatively also derivable using machine learning techniques.
3. Program and generate each state-dependent invariant into computer codes using an appropriate programming language; incorporate the generated computer codes into the PLCs using the programming language accepted by the PLC software. It is to be appreciated that while the concept to be applied for all the state-dependent invariants remains the same for each PLC, the sensors and actuators referenced in the corresponding computer codes for each PLC however depend on a domain of the associated PLC in concern and that of its immediate neighbours. This step may be completed by any engineer having the necessary PLC programming skills, or by applying machine learning techniques directly on network data collected when the ICS/CPS is operational.
4. Derive state-agnostic invariants.
5. Program and generate each state-agnostic invariant into computer codes using an appropriate programing language; incorporate the generated computer codes into the PLCs. Again (and as in the case of state-dependent invariants), the concept to be applied for each state-agnostic invariant remains the same for each PLC, the sensors and actuators referenced in the corresponding computer codes for each PLC however depend on a domain of the associated PLC in concern and that of its immediate neighbours. Similarly, this step may be completed by any engineer with the necessary PLC programming skills Attacks (for the experiments) were designed assuming that the attacker has knowledge of any one stage of the CPS and can compromise two or more sensors/actuators at that stage. A number of experiments conducted reveal that the distributed detection based on invariants is effective in detecting SSMP attacks. However, replay attacks on the first stage of a CPS, that has no previous stage, need additional state information for detection. It is important to note that the disclosed method 100 may complement other methods proposed in the literature such as intrusion detection and machine learning for which a range of commercial tools are available.

This rather large experiment consequently led to the realization of several issues and open problems summarized below.

Reconnaissance attack: An attacker might be able to get into a CPS via one of several possible vulnerabilities including those in the SCADA workstation, PLC, or HMI. However, the intrusion might be to learn system design and its operation. Such an attack cannot be detected using an approach that relies solely on invariants derived from the physics or chemistry of the CPS. As may be obvious, this is so because unless an attacker manages to fake data to PLC or send undesirable control commands to an actuator, such invariants will continue to hold and hence the attack would not be detected. Detection of such reconnaissance attacks typically relies on the traditional intrusion detection approaches.

Transient states: Any physical system is likely to include transient states. These states arise in response to a control action that affects an actuator which in turn changes the system state. However, the response time of an actuator is limited by its physical design. Thus, the actuator, as well as its host system, is considered to be in transient state, until at least when it reaches its desired (stable) state. It is possible for an attacker to take advantage of such transient states and launch attacks exactly when the system is moving from one stable to another stable other state. This aspect of attacker capability has not been accounted for in the experiments reported here.

Automated derivation and strength of invariants: In this embodiment, the invariants were derived manually. However, an on-going project aims at deriving the invariants directly from the design and assessing their strengths using a formal model named Alloy (as disclosed in related literature). Such knowledge could help in deciding whether or not to use an invariant. For example, if invariant $I_1$ detects n attacks, of which m<n, and not more, are detected by invariant $I_2$, then $I_1$ subsumes $I_2$ and hence $I_2$ could be ignored unless there is a good reason not to do so. The subsumption relationship may be further generalized by creating invariant subspaces. Such subspaces can then be used to further minimize the number of invariants actually implemented in various PLCs. This aspect of invariant minimization will be considered in future experiments.

Completeness of invariants: an open problem?: An obvious question to ask is whether the set of invariants SD and SA is complete. The completeness of SD depends on the correctness and completeness of the SCG for the system briefly described in Section 3.1. In the case of SWaT, a complete and manually verified set of SCGs is available. The invariants listed in the table 600 are derived manually from these SCGs. However, SCGs are amenable to automation and hence a complete set of SD invariants can be derived from a complete and accurate SCG for a CPS; and this could be done at the time of designing a CPS, not necessarily after it has been built as is the case in the current experiment.

There does not appear to be any known criteria to determine the completeness of SA invariants. These invariants are derived from the physics and chemistry of the system. Thus, all properties in a CPS may first be defined, and then associated SA invariants are derived, based on these properties. Another way would be to first create a list of cyber attacks and then derive invariants that will guarantee detection of each of these attacks. Such a set would be adequate with respect to the attack set though may not be complete with respect to some other criteria. These are perhaps two ways to derive a useful, but in no sense, complete, set of SA invariants. In any case, this appears to be an open problem for CPS researchers.

Co-design of invariants and attacks: an open problem?: The replay attack example in Section 6 indicates that while a detection method might be effective in detecting many attacks of a kind, it might fail to do so for other types of attacks. The question then is: Is there a procedure that takes the CPS design as input, derives invariants from the design and also shows a complete range of attacks that can and cannot be detected using the so derived invariants? Perhaps any such procedure will need to make use of the knowledge of physics and chemistry associated with the various components in the CPS.

The work in the embodiment described here is part of a long series of experiments being conducted to understand the effectiveness of various physics and chemistry based methods for attack detection. The assumption here is that such methods are likely to be powerful when used at the time of CPS design and in concert with traditional network-based detection approaches. Additional experiments are being conducted based on the attacker knowledge and capability as illustrated in FIG. 7. Though the proposed method 100 was implemented on only one CPS, it also seems applicable in CPS domains such as power networks, transportation systems, oil and natural gas systems.

While the invention has been illustrated and described in detail in the drawings and foregoing description, such illustration and description are to be considered illustrative or exemplary, and not restrictive; the invention is not limited to the disclosed embodiments. Other variations to the disclosed embodiments can be understood and effected by those skilled in the art in practising the claimed invention. For example, with reference to FIG. 1, it is to be appreciated that the at least one computing device (in variant embodiments) may also include a plurality of computing devices respectively coupled to respective at least one sensor and/or actuator, and so step 102 may accordingly include deriving respective invariants for the respective computing devices. The method 100 may also be applicable to autonomous robots and autonomous vehicles. More generally, the method 100 may be applicable to any physical system that is controlled by a computer. Moreover, the invariants may also be derivable using machine learning techniques such as genetic algorithms and variants of neural networks.

The invention claimed is:

1. A method of detecting cyber-attacks on a cyber physical system which includes at least one computing device communicatively coupled to at least one sensor and/or actuator for controlling a physical process, the method comprises:
   (i) deriving invariants for the at least one computing device, based on a system design of the cyber physical system or computer code configured to control the cyber physical system in relation to the physical process or data collected from the cyber physical system during testing or operation of the cyber physical system, the invariants defining a set of conditions that enable determination from the at least one sensor and/or actuator regarding process anomalies of the physical process being controlled, the invariants comprising at least one state-dependent invariant that defines a state of the at least one sensor and/or actuator and at least one state-agnostic invariant derived from the cyber-physical system's physics and chemistry properties;
   (ii) configuring the invariants as corresponding invariant computer program; and
   (iii) executing the invariant computer program on the at least one computing device to monitor the physical process via the at least one sensor and/or actuator and detect the process anomalies for detecting the cyber-attacks, wherein step (iii) further includes retrieving measurements from the at least one sensor and/or actuator, and matching the retrieved measurements against the set of conditions defined in the invariants to detect the anomalies in operation of the at least one sensor and/or actuator.

2. The method of claim 1, wherein the invariants are derived as a mathematical relationship involving inputs and/or output variables of the at least one sensor and/or actuator used in controlling the physical process.

3. The method of claim 1, wherein the at least one computing device includes a plurality of computing devices, each computer device respectively coupled to at least one sensor and/or actuator, and wherein step (i) includes deriving respective invariants for each of the computing devices.

4. The method of claim 3, wherein the plurality of computing devices includes being communicatively coupled to a communication network of the cyber physical system.

5. The method of claim 1, wherein the computing device includes a programmable logic controller.

6. The method of claim 1, wherein the cyber physical system is arranged to be part of a water treatment plant, a waste-to-energy plant, a transportation control centre, an oil and gas production plant, or a power grid.

7. The method of claim 1, wherein the system design of the cyber physical system is provided in the form of a plurality of state condition graphs or design diagrams.

8. The method of claim 7, wherein the design diagram is a process and instrumentation diagram or a line diagram.

9. The method of claim 1, wherein the configured computer code of the invariant is programmatically integrated with control code of the computing device.

* * * * *